H. H. EATON.
MACHINE FOR OPERATING ON THE SOLES OF BOOTS AND SHOES.
APPLICATION FILED AUG. 8, 1912.

1,222,855.

Patented Apr. 17, 1917.
6 SHEETS—SHEET 1.

Fig. 1

H. H. EATON.
MACHINE FOR OPERATING ON THE SOLES OF BOOTS AND SHOES.
APPLICATION FILED AUG. 8, 1912.

1,222,855.

Patented Apr. 17, 1917.
6 SHEETS—SHEET 2.

Fig. 2.

H. H. EATON.
MACHINE FOR OPERATING ON THE SOLES OF BOOTS AND SHOES.
APPLICATION FILED AUG. 8, 1912.

Patented Apr. 17, 1917.

Fig. 3.

H. H. EATON.
MACHINE FOR OPERATING ON THE SOLES OF BOOTS AND SHOES.
APPLICATION FILED AUG. 8, 1912.

1,222,855.

Patented Apr. 17, 1917.
6 SHEETS—SHEET 4.

Witnesses
Edward S. Day
Mabel Ackind

Inventor
Harrison H. Eaton
by his attorneys
Phillips, Van Everen & Fish

H. H. EATON.
MACHINE FOR OPERATING ON THE SOLES OF BOOTS AND SHOES.
APPLICATION FILED AUG. 8, 1912.

1,222,855.

Patented Apr. 17, 1917.
6 SHEETS—SHEET 5.

H. H. EATON.
MACHINE FOR OPERATING ON THE SOLES OF BOOTS AND SHOES.
APPLICATION FILED AUG. 8, 1912.

1,222,855.

Patented Apr. 17, 1917.
6 SHEETS—SHEET 6.

Witnesses
Edward S. Day
Mabel Ackroyd

Inventor
Harrison H. Eaton
by his attorneys
Phillips, Van Everen & Fish

UNITED STATES PATENT OFFICE.

HARRISON H. EATON, OF BEVERLY, MASSACHUSETTS, ASSIGNOR TO UNITED SHOE MACHINERY COMPANY, OF PATERSON, NEW JERSEY, A CORPORATION OF NEW JERSEY.

MACHINE FOR OPERATING ON THE SOLES OF BOOTS AND SHOES.

1,222,855.   Specification of Letters Patent.   Patented Apr. 17, 1917.

Application filed August 8, 1912. Serial No. 714,004.

*To all whom it may concern:*

Be it known that I, HARRISON H. EATON, a citizen of the United States, residing at Beverly, in the county of Essex and State of Massachusetts, have invented certain new and useful Improvements in Machines for Operating upon the Soles of Boots and Shoes; and I do hereby declare the following to be a full, clear, and exact description of the invention, such as will enable others skilled in the art to which it appertains to make and use the same.

The present invention relates to machines for operating upon the soles of boots and shoes, and more particularly to machines of this type which are employed for slashing one face of an insole to increase the flexibility.

The object of the present invention is to provide a machine of this type having a simple and efficient construction which performs the proper operations upon the soles without necessitating any manual labor upon the part of the operator except the insertion of the soles successively into the machine. With this object in view a feature of the invention contemplates the provision, in a machine for operating on soles, of simplified and improved devices for gaging the sole for the operation of the operating tool and for feeding the sole to the tool. Other features of the invention consist in improved mechanism for actuating the feeding devices, in an improved construction and arrangement of the feeding devices by which either right or left soles may be fed to the tool, in an improved construction for mounting the tools whereby any one tool may be readily selected to perform the operation on the sole, and in certain devices, combinations and arrangements of parts tending to improve and simplify the operation of machines for making soles. The advantages of these devices, combinations and arrangements of parts will be obvious to those skilled in the art from the following description.

The various features of the present invention will be readily understood from an inspection of the accompanying drawings, in which.

The machine illustrated is provided with a tool holder supporting a plurality of slashing tools any one of which may be located in proper position to form a slashed area in an insole fed to the tool by a pair of pushers. The pushers are mounted on a reciprocating slide in such manner that they may be adjusted differentially in the line of feed so as to locate the slashed area properly on different sizes of insoles, and one pusher shifted relatively to the other in order to adapt the pushers to feed either rights or lefts.

Figure 15:
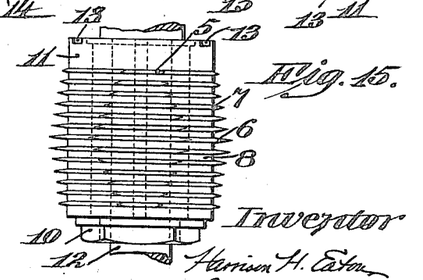
Fig. 15 is a detail in plan of a tool holder showing a plurality of tools each consisting of an opposed series of gradationally arranged parallel blades.
Figure 16:
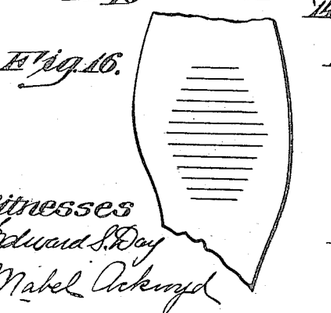
Fig. 16 is a detail in plan of a slashed insole showing the hexagonal slashed area formed by the slashing tool.

As shown, the machine is provided with a tool holder 1 (Figs. 1, 9 and 10) which supports a tool 2 for forming a slashed area in a small sized insole, a tool 3 for forming a slashed area in a medium sized insole, and a tool 4 for forming a slashed area in a large sized insole. Each of the tools comprises a series of parallel blades 5 (Fig. 15) which are arranged so that a wide blade is interposed between a series of six narrower blades decreasing gradationally in width as the blades increase in number from the widest blade. With this construction, a hexagonal area is slashed in each insole (Fig. 16). In the illustrated embodiment of the invention, there are thirty-nine blades, thirteen blades to a tool. The widest blade in each of the three tools is formed on an integral disk 6, and the remaining blades are formed on similar disks 7 there being three blades formed on each disk. The blade disks are separated from one another by a series of spacing disks 8, one of which is interposed between adjacent blade disks. The blade and spacing disks are secured by a key 9 to the tool holder 1 and are clamped together between a collar 10 threaded on the tool holder and a collar 11 shrunk on the tool holder. The tool holder 1 is loosely mounted on a reduced portion of a shaft 12 so that it may be rotated on the shaft to bring any one of the tools 2, 3 and 4 into position to perform the slashing operation.

Figure 9:
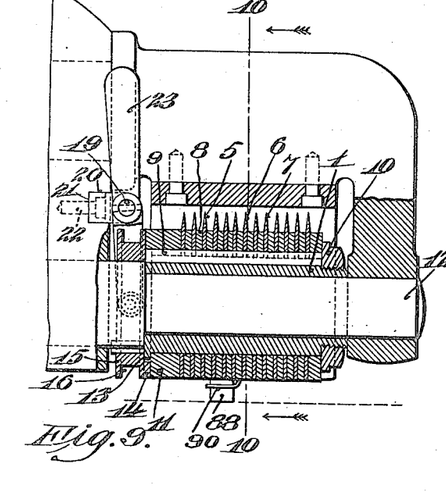
Fig. 9 is a detail in left side elevation, partly in section, of the tool holder and its associated devices.
Figure 10:
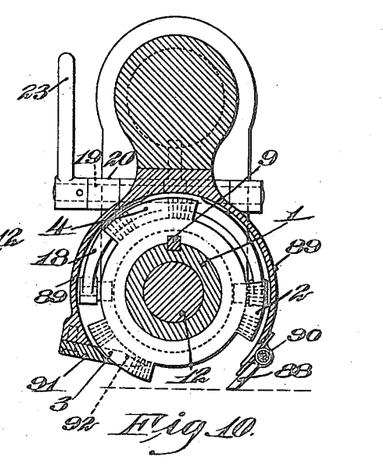
Fig. 10 is a sectional elevation on the line 10—10, Fig. 9.
Figure 11:
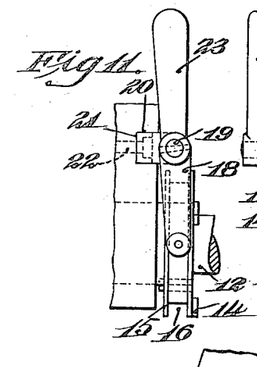
Fig. 11 is a detail in left side elevation of the locking collar for locking the tool holder to its shaft.
Figure 12:
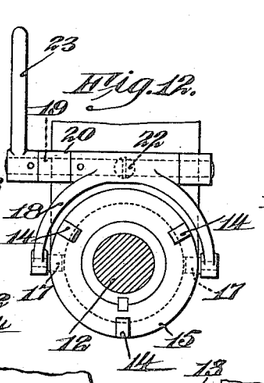
Fig. 12 is a detail in front elevation of the locking collar.
Figures 13, 14:
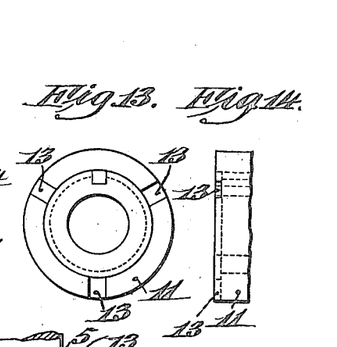
Figs. 13 and 14 are details in front and left side elevation respectively of the devices on the tool holder which coöperate with the locking collar for locking the tool holder to its shaft.

In order to lock the tool holder 1 on the shaft 12 with the selected tool in operative position the collar 11 is provided with three radial slots 13 which are engaged by three radial lugs 14 formed on a collar 15 splined to the shaft 12. The collar 15 is provided with a peripheral groove 16 engaged by a pair of rolls 17 on a yoke 18 pinned to a rock shaft 19. The rock shaft 19 is journaled in bearings formed in a plate 20 which is secured in a slot 21 in the machine frame by a screw 22 (Figs. 9, 10 and 11). Pinned to the rock shaft 19 is a handle 23, manipulation of which by the operative moves the collar 15 back and forth on the shaft 12 to insert the lugs 14 into and remove them from the slots 13 in the collar 11 to lock and unlock the tool holder 1.

To rotate the tools to bring the selected tool into operation intermittently, the shaft 12 is provided with a gear 24 which is driven by a pinion 25 on a driving shaft 26 provided with the usual fast and loose pulleys 27. Mounted on a bracket 28 secured to the machine frame is a belt shifter 29 to aid the operative in shifting the belt (not shown) from the loose to the fast pulley to drive the machine from a suitable source of power.

During the slashing operation the insole is supported on a bed roll 30 which is rotated at the same rate of speed as the operating tool. The roll 30 is keyed to a shaft 31 journaled in bearings formed in a yoke 32 supported by a vertical rod 33 carried by the machine frame. The shaft 31 is connected to a stub shaft 34, journaled in the machine frame, by a joint 35 permitting a vertical movement of the shaft 31 without affecting the operative connection between the shafts. The shaft 34 carries a gear 36 which is driven by a gear 37 on the shaft 12. To adjust the roll 30 vertically for different thicknesses of insoles the rod 33 is provided with a threaded portion 38 which is engaged by a nut 39 held, for rotation only, in a slot 40 formed in the machine frame.

The insoles may be fed to the slashing tool by hand, but in order to insure the proper location of the slashed area on the insole the operative places the insole on a table 41 carried by the machine frame with the toe end of the insole against a gage 42 and the rear edge of the insole against a pair of combined gage and feed members or pushers 43 and 44 arranged to engage the forepart and shank portions of the insole respectively. The gage and pushers are preliminarily adjusted in accordance with the size of insole to be operated upon so that when the operative places the insole in position on the table with the gage and pushers engaging the insole the accurate location of the slashed area on the face of the insole is assured.

The gage 42 is secured to a slide 45 mounted to slide parallel to the axis of the shaft 12 in ways formed in a block 46 secured to a flat plate 47 arranged to slide over the table 41 (Figs. 4 to 8). The pushers 43 and 44 are respectively carried by slides 48 and 49 mounted to slide in ways 50 and 51 formed in the block 46.

Figure 8:
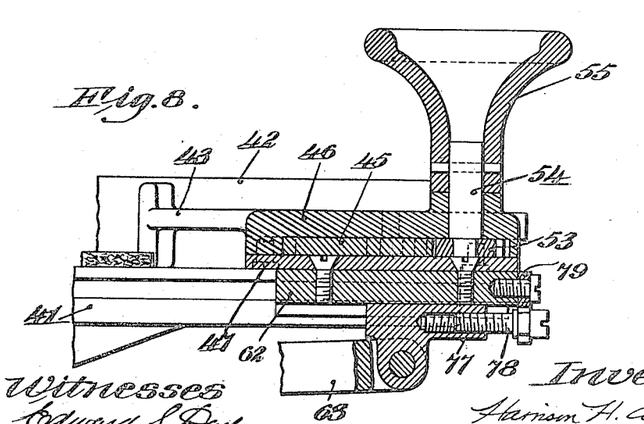
Fig. 8 is a sectional elevation on the line 8—8, Fig. 4.

In order to adjust the gage 42 so as to locate the first slash at the proper distance from the toe of the insole the slide 45 is provided with a rack 52 which is engaged by a pinion 53 carried on the lower end of a vertical shaft 54 journaled in the block 46 (Fig. 8). The shaft 54 is pinned to a handle 55, manipulation of which by the operative adjusts the gage 42 in accordance with the length of the insole. To aid the operative in determining the proper adjustment for the gage the slide 45 is provided with a scale 56 and the block 46 carries a pointer 57 arranged to indicate the adjusted position of the insole on the scale.

In order to locate the slashed area properly in accordance with the width of the insole the pushers are mounted for adjustment in the line of feed. As there is a definite relation between the length of an insole and its width, the pushers are connected to the slide 45 so that they may be moved in the direction of the feed the appropriate distance determined by the adjustment of the gage 42 for the length of the insole. To this end the slides 48 and 49 are respectively provided with blocks 58 and 59 which are embraced by slots 60 and 61 formed in the slide 45 and arranged at the proper angle to the median line of the slide 45 to impart the proper movements to the pushers. As the width at the forepart has a different relation to the length of the insole than the width at the shank, the slots 60 and 61 are arranged at different angles to the median line of the slide 45 so that the pushers 43 and 44 may be moved differentially in the line of feed.

After the gage and pushers have been adjusted in accordance with the size of insole to be operated upon and the insole placed in position on the table 41 and engaged with the gage and pushers, the latter are reciprocated to feed the insole to the slashing tool. To this end the plate 47 is secured to a slide 62 mounted to slide in ways formed in the table 41. The slide 62 is connected by a link 63 to an arm 64 loosely mounted on a rock shaft 65 journaled in a bearing formed on a bracket 66 secured to the machine frame. The arm 64 is normally held pressed against an arm 67, clamped on one end of the shaft 65, by a spring 68, coiled around the bearing for the shaft 65, one end of which engages the bracket 66 and the other end of which engages the arm 64. The other end of the rock shaft 65 is provided with an arm 69 which is connected by a link 70 to an arm 71 projecting from one end of a rock shaft 72 journaled in a bearing formed on a bracket 73 on the machine frame. The other end of the rock shaft is provided with a second arm 74 which carries a roll 75 engaged by the periphery of a cam 76 carried by the gear 24 on the shaft 12. Through the connections described, the slide 62 is normally held from movement, under the influence of the spring 68, by the cam 76. When, however, the roll 75 reaches the depression on the cam 76, the pushers are actuated by the spring 68 to feed the insole to the slashing tool. With this construction the pushers yieldingly feed the insole to the tool so that breakage is prevented in case of jamming and are positively returned to their initial position. In order that the initial position of the pushers may be varied as desired, the pivot between the slide 62 and the link 63 is mounted on a block 77 mounted to slide in ways formed in the slide 62. The block is bored to receive a screw 78 held for rotation only on a bracket 79 screwed to the slide 62.

In order that the pushers may feed either a right or a left insole to the tool, the pusher 44 is mounted for movement on its slides so that it may engage either the shank of a right or a left insole. To this end the pusher 44 is formed on a rod 80 slidably and rotatably mounted in a boss 81 formed on the slide 49. The pusher 44 is normally maintained in position to engage the shank of a left insole by a torsional spring 82 coiled around the rod, one end of which is connected to the boss 81 and the other end of which is connected to a clamp 83 on the rod. Movement of the pusher 44 under the influence of the spring 82 is limited by a collar 84 adjustably mounted on the rod 80 to determine the proper position of the pusher 44 for engagement with a left insole. To position the pusher so that it may engage the shank of a right insole the clamp 83 is provided with a handle 85 by which the operative may rotate the rod 80 in the boss 81 and slide it forward therein until a latch 86 on the clamp 83 hooks over a dog 87 on the boss 81. The pusher 44 is thus shifted from the dotted line position, Fig. 4, where it engages a left insole to the full line position, Fig. 4, where it engages a right insole.

The interval between the return of the pushers to their initial position and their actuation to feed a new insole to the slashing tool, during which time the operative must position the insole against the gage and pushers, is brief, and consequently there is some danger that an operative may not position an insole properly on the table 41. To prevent the slashing tool from operating upon a misplaced insole, the machine of the drawings is provided with a finger 88 (Figs. 1, 9 and 10) pivoted on a casing 89 for the tools and normally pressed by a spring 90 coiled around the pivot of the finger into the path of movement of the insole. With this construction if the insole is engaged by only one pusher, the finger 88 will stop the progress of the insole until it is engaged by both pushers and will then yield against the advance of the insole and ride over the insole.

Figure 1:
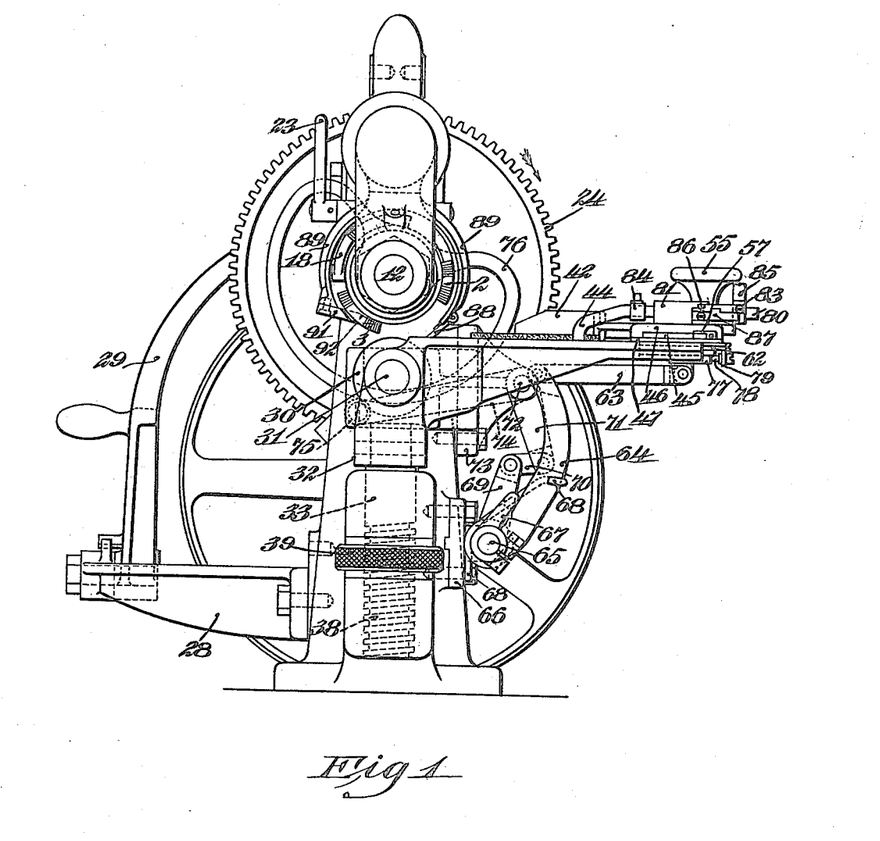
Figure 1 is a front elevation of an insole slashing machine embodying the features of the invention in the best form at present devised.
Figure 2:
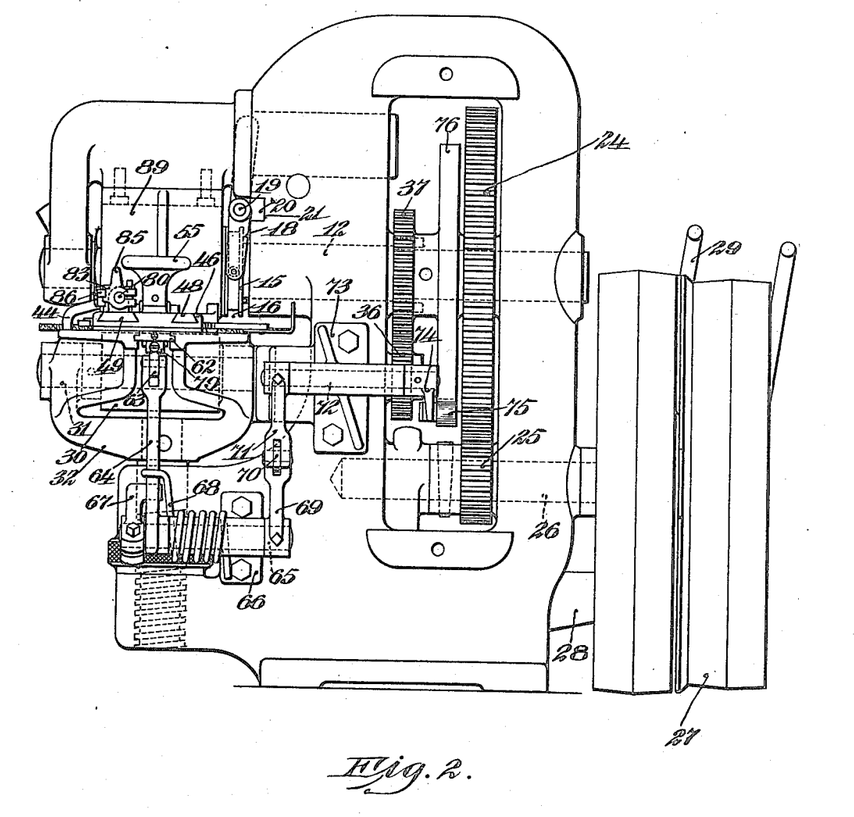
Fig. 2 is a right side elevation.
Figure 3:
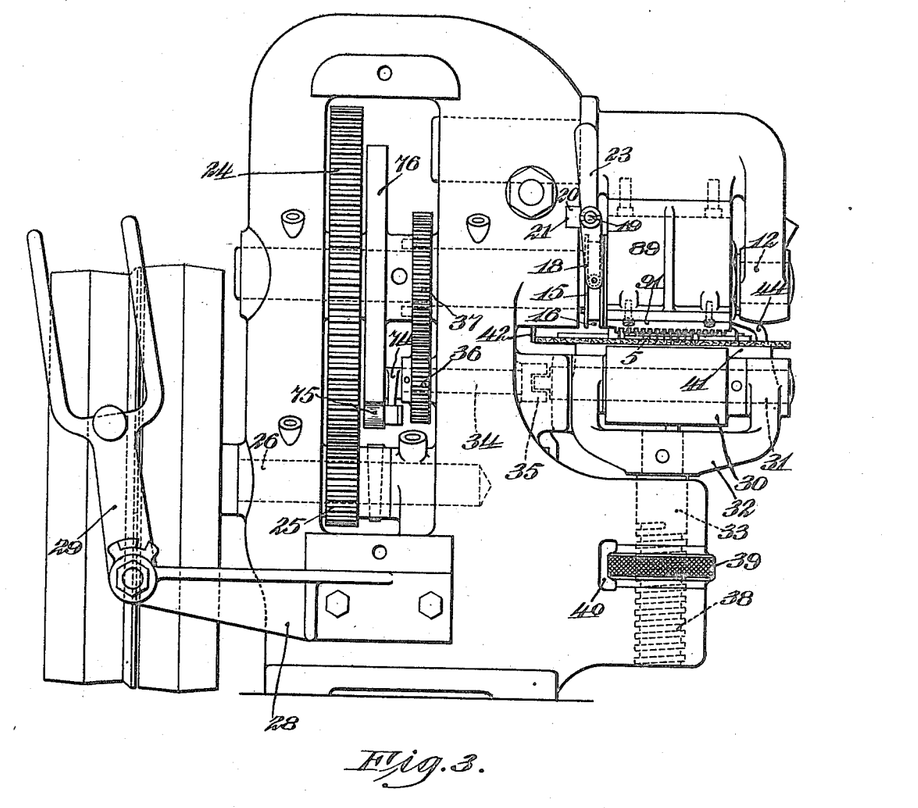
Fig. 3 is a left side elevation.
Figure 4:
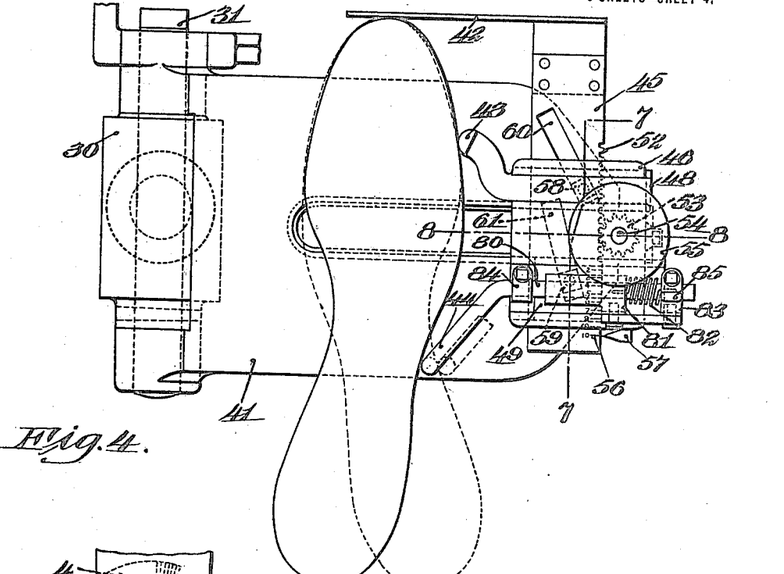
Fig. 4 is a detail in plan of the gaging and pushing devices for feeding the insole to the slashing tool.
Figure 5:
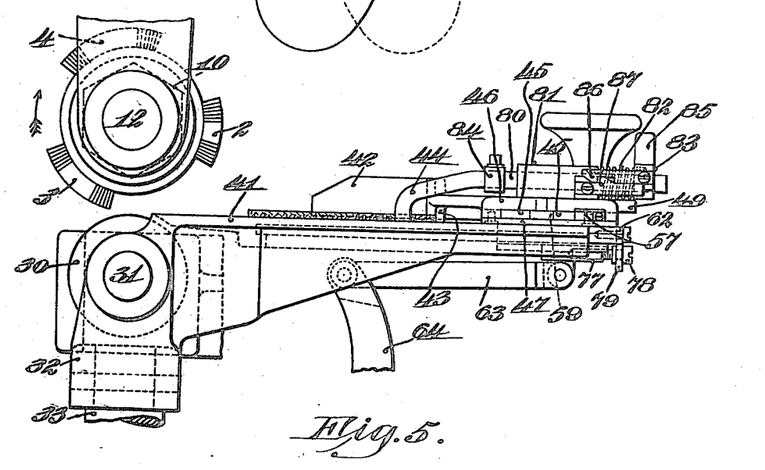
Fig. 5 is a detail in front elevation of the parts illustrated in Fig. 4.
Figure 6:
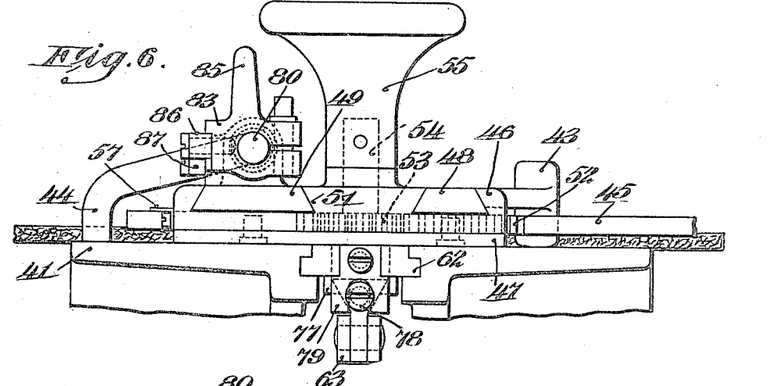
Fig. 6 is a detail in right side elevation of the parts illustrated in Figs. 4 and 5.
Figure 7:
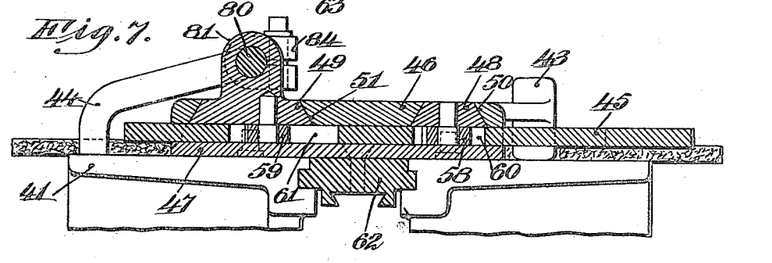
Fig. 7 is a sectional elevation on the line 7—7, Fig. 4.

As the insole is fed between the slashing tool and roll 30 it is removed from the pushers by the grip of the tool and roll. To prevent the insole sticking to the slashing tool and thus become wound around the shaft 12, the casing 89 is provided with a series of strippers 91, each of which is provided with a beveled end 92 and arranged between adjacent blade disks (Figs. 1, 3 and 10).

While the features of the invention have been illustrated and described in connection with a machine for slashing insoles, it will be apparent to those skilled in the art that the invention is not limited to such machines, but that certain features of the invention may be useful in connection with machines for performing other operations upon insoles, or, in fact with any machine for operating upon soles.

What is claimed as new, is:—

1. An insole slashing machine having, in combination, a tool for forming a slashed area in one face of an insole, a plurality of pushers arranged to engage the edge of the insole and feed the insole to the slashing tool, a gage for one end of the insole, and connected mechanism for adjusting the gage and pushers to properly locate the slashed area on different sizes of insoles, substantially as described.

2. A machine for operating on soles, having in combination, an operating tool, gages for determining the initial position of the sole with relation to the operating tool, means for adjusting the gages both laterally and longitudinally, and connecting mechanism for causing a simultaneous lateral and longitudinal adjustment of the gages, substantially as described.

3. A machine for operating on soles, having in combination, an operating tool, gages contacting with the side of the sole at opposite ends to position the sole laterally, means for adjusting the gages laterally of the sole, and connecting mechanism acting to secure a differential adjustment of the gages, substantially as described.

4. A machine for operating on soles, having in combination, an operating tool, a gage for determining the longitudinal position of the sole, gages for determining the lateral position of the sole, adjusting means for the gages, and connecting mechanism for causing a simultaneous adjustment of all the gages to properly position varying sizes of soles, substantially as described.

5. A machine for operating on soles having, in combination, an operating tool, a gage arranged to engage one end of a sole, a pusher arranged to engage the forepart of the sole, a second pusher arranged to engage the shank of the sole, and a single means for simultaneously adjusting the gage and pushers to properly position different sizes of soles for the operation of the operating tool, substantially as described.

6. A machine for operating on soles having, in combination, an operating tool, a gage arranged to engage one end of a sole, a pusher arranged to engage the forepart of the sole, a second pusher arranged to engage the shank of the sole, a slide for the gage, an independent slide for each of the pushers, a rack formed on the gage slide, connections between the pusher slides and the gage slide, and a pinion meshed with the rack for simultaneously adjusting the gage and pushers to properly position different sizes of soles for the operation of the operating tool, substantially as described.

7. A machine for operating on soles having, in combination, a rotary operating tool, a slide movable at right angles to the axis of the tool, a second slide carried by the first slide and arranged to move parallel to the axis of the tool, a plurality of pushers for feeding the sole to the tool carried by the first slide and operatively connected to the second slide, and means for actuating the second slide to adjust the pushers in the line of feed, substantially as described.

8. A machine for operating on soles having, in combination, an operating tool, gages contacting with the side of the sole at opposite ends to position the sole laterally, mechanism for simultaneously adjusting the gages to accommodate varying sizes of soles, and independent mechanism for adjusting one of the gages relative to the other to accommodate right and left soles, substantially as described.

9. A machine for operating on soles having, in combination, an operating tool, a plurality of independent pushers arranged to engage the edge of a sole to feed the sole to the operating tool, means for relatively latching the pushers in position to feed a right sole to the tool, and means for tripping the latch to relatively shift the pushers to adapt them to feed a left sole to the tool, substantially as described.

10. A machine for operating on soles having, in combination, an operating tool, a plurality of independent pushers arranged to engage the edge of a sole and feed the sole to the operating tool, means for relatively shifting the pushers to adapt them to feed rights and lefts, and connected mechanism separate from the shifting means for adjusting the pushers differentially to adapt them to feed different sizes of soles, substantially as described.

11. An insole slashing machine comprising a supporting shaft, a tool head, a plurality of tools carried upon the head, mechanism for actuating the shaft, means for adjusting the head angularly about the shaft rotatively, and means for locking the head in adjusted position on the shaft, substantially as described.

12. A machine for operating on soles having, in combination, an operating tool, a feed table, a spring actuated arm operatively connected with the table and normally tending to move the table toward the operating tool to provide a yielding feed for the work, a cam arranged to control the movement of the table, and connections between the cam and arm to positively retract the table against the action of the spring, substantially as described.

13. A machine for operating on soles having, in combination, an operating tool, and means for feeding a sole to the operating tool comprising a pusher arranged to engage the forepart of the sole, and a pusher arranged to engage the shank of the sole, a slide for each pusher, and means for securing the shank engaging pusher to its slide comprising a rod on the pusher slidably and rotatably mounted in the slide, substantially as described.

14. A machine for operating on soles having, in combination, an operating tool, and means for feeding a sole to the operating tool comprising a pusher arranged to engage the forepart of the sole, and a pusher arranged to engage the shank of the sole, a slide for each pusher, means for securing the shank engaging pusher to its slide comprising a rod on the pusher slidably and rotatably mounted in the slide, and a torsional spring connected to normally hold the pusher in position to engage a left sole, substantially as described.

15. A machine for operating on soles having, in combination, an operating tool, and means for feeding a sole to the operating tool comprising a pusher arranged to engage the forepart of the sole, and a pusher arranged to engage the shank of the sole, a slide for each pusher, and means for securing the shank engaging pusher to its slide comprising a rod on the pusher slidably and rotatably mounted in the slide, a torsional spring connected to normally hold the pusher in position to engage a left sole, and a latch for holding the pusher in position to engage a right sole, substantially as described.

16. An insole slashing machine having, in combination, a shaft, a tool holder loosely carried thereby, a plurality of tools for forming different slashed areas in insoles carried by the tool holder, a collar splined to the shaft, and coöperating locking devices on the collar and tool holder whereby the tool holder may be locked to rotate with the shaft and any one of the tools selected to perform the slashing operation, substantially as described.

17. In an insole rotary slashing machine, a slashing tool provided with an opposed series of gradationally arranged parallel blades for forming a hexagonal slashed area in one face of the insole and means for feeding the sole transversely to the tool, substantially as described.

18. An insole slashing machine having, in combination, a rotary tool carrier, a plurality of tools supported on the carrier, means for adjusting the carrier to bring any desired tool into operative position to act upon the sole, means for feeding a sole to the tool, and mechanism for rotating the tool carrier to slash the sole, substantially as described.

HARRISON H. EATON.

Witnesses:
CHESTER E. ROGERS,
LAURA M. GOODRIDGE.

Copies of this patent may be obtained for five cents each, by addressing the "Commissioner of Patents, Washington, D. C."

It is hereby certified that in Letters Patent No. 1,222,855, granted April 17, 1917, upon the application of Harrison H. Eaton, of Beverly, Massachusetts, for an improvement in "Machines for Operating on the Soles of Boots and Shoes," errors appear in the printed specification requiring correction as follows: Page 4, line 100, claim 11, after the word "shaft" insert the word *rotatively;* same page and claim, line 102, strike out the word "rotatively"; page 5, line 36, claim 17, strike out the word "rotary"; same page and claim, line 37, before the word "slashing" insert the word *rotary;* and that the said Letters Patent should be read with these corrections therein that the same may conform to the record of the case in the Patent Office.

Signed and sealed this 19th day of June, A. D., 1917.

[SEAL.]

F. W. H. CLAY,
*Acting Commissioner of Patents.*